United States Patent [19]

Fujikawa et al.

[11] Patent Number: 4,988,161
[45] Date of Patent: Jan. 29, 1991

[54] OPTICAL FIBER FIXING ELEMENT AND METHOD OF MANUFACTURING SAME

[75] Inventors: Junji Fujikawa; Fumiaki Tamura, both of Siga, Japan

[73] Assignee: Nippon Electric Glass Co., Ltd., Otsu, Japan

[21] Appl. No.: 398,561

[22] Filed: Aug. 25, 1989

[30] Foreign Application Priority Data

Aug. 26, 1988 [JP] Japan .................................. 63-213149

[51] Int. Cl.$^5$ ............................ G02B 6/36; G02B 7/26
[52] U.S. Cl. .................................. 350/96.20; 350/96.21
[58] Field of Search ............................ 350/96.20, 96.21

[56] References Cited

U.S. PATENT DOCUMENTS 4,822,129   4/1989   Webb .................................. 350/96.20

Primary Examiner—William L. Sikes
Assistant Examiner—Robert E. Wise
Attorney, Agent, or Firm—Armstrong, Nikaido, Marmelstein, Kubovcik & Murray

[57] ABSTRACT

An optical fiber fixing element consists of a glass tube having an inner hole for receiving a clad portion of an optical fiber and which is formed at one end with a conical flared portion converging into the inner hole and a recess for receiving a cover portion of the optical fiber thereinto, both the flared portion and the recess being formed concentrically with the glass tube. A method of manufacturing such optical fiber fixing element is also provided which comprises forming an erosion resistant film on an outer surface, other than an end face, of a glass tube having an inner hole, treating the end face of the glass tube with a glass erosive solution to thereby form a flared portion, and grinding the flared portion to thereby form a recess in the flared portion.

3 Claims, 1 Drawing Sheet

OPTICAL FIBER FIXING ELEMENT AND METHOD OF MANUFACTURING SAME

BACKGROUND OF THE INVENTION

This invention relates to an optical fiber fixing element and method of manufacturing same.

An optical fiber consists of a core serving as an optical waveguide, and a clad portion surrounding the core concentrically therewith, and a cover portion which covers the clad portion.

For the purpose of fixing an optical fiber of the above mentioned construction, it has been known to use a fixing element of the double tube construction type which comprises a capillary tube formed of a ceramic material, glass or the like and having an inner hole for receiving the clad portion of the optical fiber, the inner hole being flared at one end, and a protecting tube made of stainless steel or the like for receiving the cover portion of the optical fiber and fixing it therein which has an inner diameter about even with the outer diameter of the capillary tube and a larger length than the capillary tube, the capillary tube being fitted in the protecting tube.

An optical fiber fixing element is required to be of high precision in order to minimize possible loss of optical fiber due to connection, and insofar as optical fiber fixing elements of the double tube construction type are concerned, it is necessary that both the capillary tube and the protecting tube be fabricated with good precision. Therefore, such optical fiber fixing element is disadvantageous in that its parts are expensive to manufacture, and in that manufacture of the fixing element involves troublesome assembly work.

SUMMARY OF THE INVENTION

This invention has been made in view of these problems with the prior art optical fiber fixing element, and accordingly it contemplates the provision of an optical fiber element which is of high precision and efficiently workable, and of a method which makes it possible to manufacture such optical fiber element easily and at lower cost.

In order to accomplish the above objective, according to the invention there is provided a method of manufacturing an optical fiber fixing element which comprises covering with a film of an erosion resistant solution an outer surface, other than an end face, of a glass tube having an inner hole for receiving a clad portion of an optical fiber thereinto, then treating the end face of the glass tube with a glass erosive solution to thereby to cause the end face to be formed with a flared portion, and subsequently grinding the flared portion to form a recess for fitting a cover portion of the optical fiber thereinto.

The reason why glass is used as the material of the fixing element is that glass is closely akin to optical fiber in properties, such as thermal coefficient of expansion and aritightness, and is easy to form to shape and easy to work. Preferably, a UV transmissible glass is used. When an ultraviolet curing resin as an adhesive is injected into the fixing element before the optical fiber is inserted and fixed therein, the optical fiber can be readily and quickly bonded in place by irradiating ultraviolet light after the optical fiber is inserted into the fixing element.

According to the method of the invention, it is possible to easily form the flared portion of the glass tube with a recess for fitting therein the cover portion of the optical fiber because the flared portion is formed in a uniformly angled radial fashion so that a drill edge is allowed to reach a depth of the flared portion so that straight grinding can produce a recess concentric with the inner hole of the glass tube.

The glass tube produced according to the method of the invention is such that the flared portion at its end is formed to a uniformly angled trumpet shape and has a smoothly finished surface, and therefore the flared portion exhibits good guide function to permit the clad portion of the optical fiber to be fitted in position very easily and it is not liable to any crack occurrence in its finished surface that may possibly lead to grass breakage. This method of securing the cover portion into position by providing a cylindrical recess having the inner diameter being slightly larger than the outer diameter of the cover portion will prevent the optical fiber from cracking due to stresses imposed on the cover portion as a result of bending during handling and assembly processes.

One embodiment of the invention will now be described with reference to the accompanying drawings.

DESCRIPTION OF THE PREFERRED EMBODIMENT

Figures 1A, 1B, 1C:
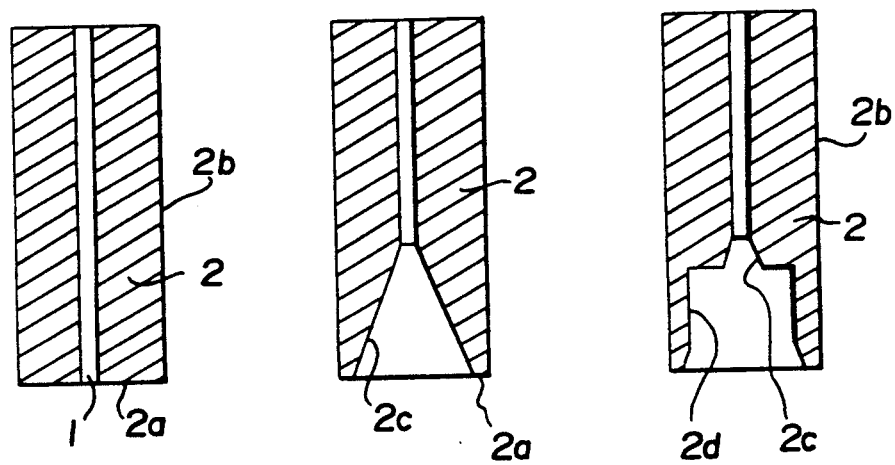
FIGS. 1 (A), 1 (B), and 1 (C) are longitudinal sectional facturing an optical fiber fixing element according to the invention.

FIGS. 1 (A), 1 (B), and 1 (C) illustrate steps involved in the method of manufacturing an optical fiber fixing element according to the invention. Initially, an outer surface 2b, other than an end face 2a, of a glass tube 2 having an inner hole 1 is covered with an erosion resistant film. The glass tube 2 is of such small size as, for example, 1.8 mm in outer diameter, 0.1 mm in inner hole diameter, and 12.5 mm in length. It is produced by forming a tube according to a well known glass tube drawing method, then cutting it to length. The erosion resistant film has erosion resistance such that it is not liable to erosion due to such a glass erosive solution as will be described hereinafter; for example, it is of an acrylic, PVC, or epoxy resin material. The end face 2a of the glass tube 2 is subsequently immersed in the glass erosive solution to thereby form a flared portion 2c. This glass erosive solution is preferably a mixed oxygen fluoride solution, for example, and a method generally employed for the purpose of immersion is such that the glass tube 2 with the end face 2a oriented downward is immersed in a bath containing the glass erosive solution. Immersion time required may vary according to the composition, temperature, and concentration of the erosive solution used, but generally it is within the range of from 5 to 130 minutes. As a result of such erosion step corner portions between the inner hole 1 and end face 2a of the glass tube 2 are particularly eroded so that the inner hole 1 is enlarged into a trumpet shape, a flared portion 2c being thereby formed. After the erosion treatment, the glass erosive solution present on the surface of the glass tube 2 is rinsed by water washing; and then the erosion resistant film formed on the outer surface 2b of the glass tube 2 is subjected to heat treatment in a heating oven so that it is burned away, which step is followed by washing. Subsequently, a carbide drill is brought in contact with an innermost part of the flared portion 2c of the glass tube 2 for coaxially grinding the flared portion 2c to thereby form a recess 2d concentric with the inner hole 1.

Figure 2:
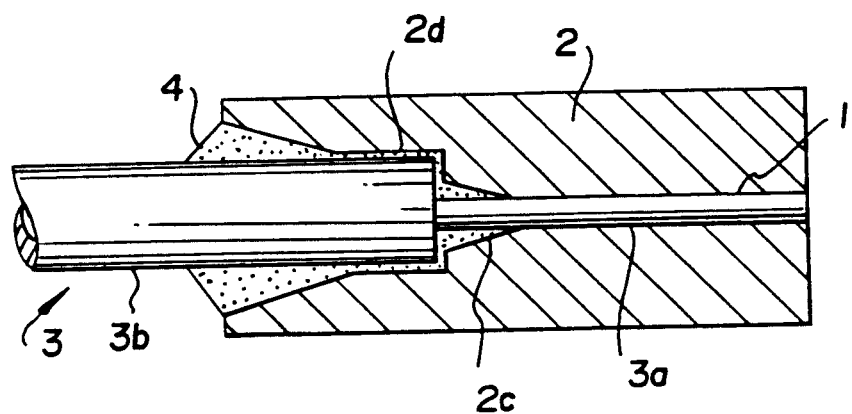
FIG. 2 is a longitudinal sectional view showing an optical fiber inserted into an optical fiber fixing element manufactured according to the method of the invention.

FIG. 2 shows by way of example an optical fiber fitted into an optical fiber fixing element manufactured by the method of the invention. A clad portion 3a of the optical fiber 3 is inserted in the inner hole 1 of the glass tube 2, and the cover portion 3b of the optical fiber 3 is fitted in the recess 2d of the glass tube 2, being bonded in position by adhesive 4. The flared portion 2c formed in the glass tube 2 permits the clad portion 3a of the optical fiber 3 to be readily fitted into the inner hole 1.

As described above, according to the invention, it is possible to easily and inexpensively manufacture an optical fiber fixing element which permits efficient insertion of a clad portion of an optical fiber into an inner hole of a glass tube and fitting and fixing a cover portion of the optical fiber in position.

What is claimed is:

1. A method of manufacturing an optical fiber fixing element comprising the steps of forming an erosion resistant film on an outer surface, other than an end face, of a glass tube having an inner hole for receiving a clad portion of an optical fiber therein, treating the end face of the glass tube with a glass erosive solution to thereby form the end face with a flared portion, and grinding the flared portion to form a recess for fitting a cover portion of the optical fiber thereinto.

2. An optical fiber fixing element including a glass tube having an inner hole for receiving a clad portion of an optical fiber thereinto, comprising a flared portion and a cylindrical recess having an inner diameter being slightly larger than an outer diameter of a cover portion of the optical fiber, both the flared portion and the cylindrical recess being formed at one end of the glass tube in concentric relation with the glass tube.

3. An optical fiber fixing element as described in claim 2, whereas said cover portion, said clad portion, and glass tube are cemented together as one contiguous unit.

* * * * *